US008908279B2

(12) United States Patent
Omura et al.

(10) Patent No.: US 8,908,279 B2
(45) Date of Patent: Dec. 9, 2014

(54) HEAD-MOUNTED DISPLAY SYSTEM

(75) Inventors: Koji Omura, Kyoto (JP); Tsunehisa Ohashi, Kyoto (KP)

(73) Assignee: Shimadzu Corporation, Kyoto (JP)

( * ) Notice: Subject to any disclaimer, the term of this patent is extended or adjusted under 35 U.S.C. 154(b) by 217 days.

(21) Appl. No.: 13/495,441

(22) Filed: Jun. 13, 2012

(65) Prior Publication Data

US 2012/0243103 A1 Sep. 27, 2012

(30) Foreign Application Priority Data

Dec. 3, 2009 (JP) .................................. 2009-275420

(51) Int. Cl.
*G02B 27/14* (2006.01)
*G02B 27/01* (2006.01)
*G02F 1/1335* (2006.01)

(52) U.S. Cl.
CPC ...... *G02B 27/0172* (2013.01); *G02F 1/133603* (2013.01); *G02F 1/133608* (2013.01); *G02F 1/133611* (2013.01); *G02B 2027/0118* (2013.01); *G02F 1/133606* (2013.01); *G02F 2001/133607* (2013.01)
USPC .......................................................... 359/630

(58) Field of Classification Search
CPC .................. G02B 2027/0118; G02B 27/0172; G02F 1/133603; G02F 1/133606; G02F 1/133608; G02F 1/133611; G02F 2001/133607
USPC .......................................................... 359/630
See application file for complete search history.

(56) References Cited

U.S. PATENT DOCUMENTS

| 5,589,956 | A  | * | 12/1996 | Morishima et al. ............. 359/15 |
| 2003/0147055 | A1 | * | 8/2003 | Yokoyama ....................... 353/98 |
| 2010/0214635 | A1 | * | 8/2010 | Sasaki et al. .................... 359/15 |

* cited by examiner

*Primary Examiner* — Thomas K Pham
*Assistant Examiner* — Vipin Patel
(74) *Attorney, Agent, or Firm* — McDermott Will & Emery LLP

(57) ABSTRACT

A head-mounted display system having a light source made up of a plurality of light-emitting diodes; a flat-panel display for producing an image on a flat-panel; a projecting mechanism having a cylindrical housing; and an eye-proximate optical system, wherein: the flat-panel display is secured within the housing so as to be inclined so that the normal direction to the flat-panel is not a pupillary axial direction; the light source is secured within the housing so that the direction of emission of the light that is emitted from each light-emitting diode is coincident with the pupillary axial direction and so that each light-emitting diode is at an equal distance from the flat panel; and a reflecting plate, for reflecting the light that is emitted from the light source, is formed so as to be at the inner peripheral face of the housing, placed between the light source and the flat-panel display.

7 Claims, 10 Drawing Sheets

HEAD-MOUNTED DISPLAY SYSTEM

CROSS REFERENCE TO RELATED APPLICATION

This application is based on Japanese Patent Application No. 2009-275420 filed Dec. 3, 2009, which is incorporated herein by reference. This application was published Jun. 16, 2011 as JP 2011-118151.

FIELD OF TECHNOLOGY

The present invention relates to a head-mounted display system for providing a virtual image of an image to be viewed by an observer, for example, relating to a head-mounted display system for providing an image to, for example, a pilot of a helicopter or an airplane, a user of a training simulator, a user of a consumer gaming machine, or information terminal, or the like.

BACKGROUND

It is useful to be able to use, depending on the situation, both visual information obtained through a specialized camera for a range that is outside of what can be obtained through the naked eye to obtain visual information that cannot be obtained by the naked eye, depending on the situation. It is also useful to use visual information through the naked eye. For example, in aircrafts, or in applications for the purposes of crime prevention, security, and defense, and so forth, there have been proposals for helmets with display systems (e.g., a head-mounted display system) wherein night-vision cameras have been mounted on helmets (see, for example, Japanese Unexamined Patent Application Publication H9-188911 and Japanese Examined Patent Application Publication 2001-515150). In this type of helmet with display system, the visual information that can be obtained through the night-vision camera can be projected onto the visor (an eye-proximate optical system) of the helmet. Therefore the wearer of the helmet with display system (e.g., the observer) is able to view clearly even in environments such as the night.

Moreover, in applications for the purposes of performing rescue operations by firefighters and rescue teams, there have been proposals for helmets with display systems (e.g., head-mounted display systems) wherein infrared cameras have been mounted on the helmets (see, for example, Japanese Unexamined Patent Application Publication H8-054282). In this type of helmet with a display system, the visual information that can be obtained through the infrared camera can be projected onto the visor (an eye-proximate optical system) of the helmet. Therefore, the wearer of the helmet with display system (the observer) is able to see more clearly even in an environment such as the scene of a disaster.

FIG. 9 is a side view diagram illustrating one example of a helmet with a display system (i.e., a head-mounted display system) that is worn on the head of a wearer, consistent with an embodiment of the present invention, where FIG. 10 is a plan view diagram illustrating schematically the structure of the helmet with display system 100 that is illustrated in FIG. 9, consistent with an embodiment of the present invention.

The helmet with display system 100 comprises: a helmet 1 that is worn on the head of a wearer P; a visor (an eye-proximate optical system) 13 that is placed in front of the wearer P; a left-eye night-vision camera 2L, placed on the left side of the helmet 1, for capturing a left-eye image, a right-eye night-vision camera 2R, placed on the right side of the helmet 1, for capturing a right-eye image; a left-eye display unit (projecting mechanism) 110L that is placed to the upper left of the wearer P, a right-eye display unit (projecting mechanism) 110R that is placed to the upper right of the wearer P; and a video signal processing unit 3 for controlling the left-eye night-vision camera 2L, the right-eye night-vision camera 2R, the left-eye display unit 110L, and the right-eye display unit 110R.

In one embodiment, helmet 1 is a semi-spherical shape that covers the head of the wearer, and wherein the face is open.

In one embodiment, visor 13 has a specific curved surface shape. Visor 13 is structured from a half mirror, a hologram element, or the like. In one embodiment, the visor 13 is supported on the helmet 1 in a state wherein it can be slid upward or downward. When the visor 13 is lowered, it is positioned in front of the left eye EL and the right eye ER of the wearer P.

The curved surface shape of the visor is, for example, a concave surface of an off-axis toric shape wherein the absolute value of the curvature $1/R_x$ in the X direction is large and the absolute value of the curvature $1/R_y$ in the Y direction is small. The "off-axis toric shape" is expressed by a surface defined by the shape function provided by Equation (1), below, in an XYZ coordinate space, wherein the surface has a center that is eccentric relative to the axis of symmetry of the surface.

[EQUATION 1]

$$Z = \frac{c_x X^2 + c_y Y^2}{1 + \sqrt{1 - (1+k_x)c_x^2 X^2 - (1+k_y)c_y^2 Y^2}} \quad (1)$$

Here, $c_x$ and $c_y$ are the curvatures $1/R_x$ and $1/R_y$ in the X and Y directions, and $k_x$ and $k_y$ are the second-order curved-surface coefficients in the X direction and the Y direction.

The left-eye night-vision camera 2L and the right-eye night-vision camera 2R have a night-vision function that amplifies the intensity of the received visible light or infrared light (with a wavelength of, for example, more than 610 nm). This makes it possible to see an observed object that emits or reflects infrared light in the surroundings, even under dark conditions (e.g., at night).

Moreover, in order to enable a stereoscopic view of the observed object, the left-eye night-vision camera 2L and the right-eye night-vision camera 2R are positioned on the left side and the right side, respectively, of helmet 1 with a specific distance between the cameras, with the individual imaging directions (optical axes) thereof in a direction that is perpendicular to the direction of separation between the cameras.

A video signal processing unit 3 inputs the video signals (visual information) from the left-eye night-vision camera 2L and the right-eye night-vision camera 2R, and controls the outputting of the image signals from the left-eye display unit 110L and the right-eye display unit 110R.

In one embodiment of the display system 100, the left-eye image displaying light that is projected from the left-eye display unit 110L is directed towards the left eye EL of the wearer P through reflecting on the reflective surface of the visor 13, and the right-eye image displaying light that is projected from the right-eye display unit 110R is directed to the right eye RE of the wearer through reflecting on the reflective surface of the visor 13. The result is that the wearer P is able to view a virtual image of the observed object stereoscopically, and able to view the actual objects that are ahead through the light that passes through the visor 13.

However, the reflective surface of the visor 13, as described above, typically has a specific curved surface shape, and the head of the wearer P is located at the front face of the visor 13, and thus the left-eye image displaying light that is emitted from the left-eye display unit 110L and the right-eye image displaying light that is emitted from the right-eye display unit 110R is projected toward the reflecting face of the visor 13 in order to avoid the head of the wearer P. Accordingly, a non-coaxial optical system is structured to form a virtual image without distortion in front of the wearer P.

FIG. 5 is a cross-sectional diagram illustrating one example of a schematic structure of a conventional left-eye display unit. FIG. 6 is a perspective diagram of the light source illustrated in FIG. 5.

The left-eye display unit 110L has a light source 114L, a transmissive flat-panel liquid crystal display 11L, and a square cylindrical plastic housing 115L. The light source 114L is placed within one end side of the square cylindrical housing 115L, and some optical elements 12L are placed on the inside of the other end portion of the cylindrical housing 115L, where the transmissive flat-panel liquid crystal display 11L is placed within the cylindrical housing 115L in the center portion thereof.

The transmissive flat-panel liquid crystal display 11L forms an image on the flat-panel (which is, for example, 1 inch) based on an image signal from the video signal processing unit 3.

However, in the helmet with display system 100 there is a non-coaxial optics system that is structured from some optical elements 12L, for the reasons described above, and thus the flat-panel liquid crystal display 11L is secured within the housing 115L so that the direction BL of the normal line of the flat-panel is inclined at an angle α relative to the pupillary axial direction AL.

The light source 114L has a substrate 121 that is made from a flat plate of plastic, and a plurality (e.g., 65) light-emitting diodes 22. A plurality of light-emitting diodes 22 are placed two-dimensionally in a checkerboard grid shape on the upper face (in an XY plane) of the substrate 121, where each light-emitting diode 22 emits light in the direction that is perpendicular to the XY plane (that is, in the Z direction). Note that in regards to the light that is emitted from each individual light-emitting diode 22, the intensity of the emitted light from the center portion in the forward direction (the direction of the optical axis of the light-emitting diode) is high, where the intensity of light-emission becomes lower, closer toward the edge.

Moreover, the light source 114L is secured within the housing 15L so that the Z direction is coincident with the pupillary axial direction AL. As a result, the image that is displayed on the flat-panel is illuminated. At this time, the Z axis is coincident with the pupillary axial direction AL, and thus bright left-eye image displaying light is directed to the left eye EL of the wearer P.

In one embodiment, the right-eye display unit 110R has the same structure as the left-eye display unit 110L.

However, in the left-eye display unit 110L as described above, even though the bright left-eye image displaying light is directed towards the left eye EL of the user, it is the left-eye image displaying light that is non-uniformity that is directed towards the left eye EL of the wearer P. Specifically, because the distance between the top end portion of the flat-panel and the light-emitting diodes 22 is far, the brightness at the top end portion of the virtual image of the observed object is low, and because the distance between the bottom end portion of the flat-panel and the light-emitting diodes 22 is near, the brightness of the bottom end portion of the virtual image of the observed object is high.

Accordingly, in one aspect the present applicant has developed a left-eye display unit wherein it is possible to reduce the brightness non-uniformity of virtual images of observed objects. FIG. 7 is a cross-sectional diagram illustrating one example of a schematic structure of a left-eye display unit. Note that for those portions that are identical to those of the left-eye display unit 110L, identical codes may be assigned.

In the left-eye display unit 130L, the direction of emission of the light that is emitted from each individual light-emitting diode 22 is coincident with the pupillary axial direction AL, and the attachment within the housing 115L is such that there are equal distances $L_1$ between each individual light-emitting diode 22 and the transmissive flat-panel liquid crystal display 11L. This illuminates the image displayed by the flat panel. At this time, the direction of emission of light that is emitted from the individual light-emitting diodes 22 is coincident with the pupillary axial direction AL. That is, the bright left-eye image displaying light is directed to the left eye EL of the wearer P. In one embodiment, the light-emitting diodes 22 are each placed so as to each be at the identical distance $L_1$ from the flat panel. That is, the left-eye image displaying light wherein the non-uniformity in brightness is reduced is directed toward the left eye EL of the wearer P so that the brightness at the upper edge portion of the virtual image of the observed object is equal to the intensity at the lower edge portion.

However, in the left-eye display unit 130L, when compared to the left-eye display unit 110L, even though the left-eye image displaying light, the brightness non-uniformity of the virtual image of the observed object that is reduced is directed toward the left eye EL of the wearer P. The intensity of the peripheral portion of the virtual image of the observed object is low, and there is a problem in that there is brightness non-uniformity, wherein the intensity is low in the peripheral portions of the virtual image of the observed object, and wherein the intensity is high in the central portion of the virtual image of the observed object.

SUMMARY

The present inventors performed investigations regarding methods for reducing the brightness non-uniformity of the virtual image of the observed object, in order to solve the problem set forth above. The light emitted from the light-emitting diodes is diffused at a given spreading angle (e.g., 120°). Accordingly, it was discovered that the intensity at the peripheral edge portions of a virtual image of an observed object can be increased through the formation of a reflecting plate, for reflecting light, on the inner peripheral face of the housing, with the individual light-emitting diodes arranged so as to each be an equal distance from the flat panel.

Some embodiments of the head-mounted display system according to the present invention include a projecting mechanism having a light source, including a plurality of light-emitting diodes; a flat-panel display for producing an image on a flat-panel; and a cylindrical housing; wherein: the light source and the flat-panel display are placed within the housing, and the image that is displayed on the flat-panel is illuminated with light that is emitted from the light source, to project image displaying light for displaying the image; and an eye-proximate optical system placed in front of an eye of an observer; wherein the image displaying light that is emitted from the projecting mechanism is directed to the eye of the observer through the eye-proximate optical system to form a virtual image of an observed object in front of the observer, wherein: the flat-panel display is secured within the housing so that the normal direction to the flat-panel is not coincident with the pupillary axial direction; the light source is secured within the housing so that the direction of emission of the light that is emitted from the individual light-emitting diodes is coincident with the pupillary axial direction, and so that the individual light-emitting diodes are each at equal distances from the flat panel; and a reflecting plate for reflecting the light that is emitted from the light source is formed on the inner peripheral face of the housing, placed between the light source and the flat-panel display.

Here the "direction of emission of the light that is emitted from a light-emitting diode" refers to the direction of the light that is emitted from the central portion of the light-emitting diode. Note that in regards to the light that is emitted from the light-emitting diodes, this light diffuses at a given spreading angle (e.g., 120°), where this refers to the direction of the light that is emitted from the center portion of the light-emitting diode (e.g., the optical axis of the light-emitting diode).

For example, the "pupillary direction" refers to a light beam that passes through the center of the left eye or the right eye and the flat-panel display, and through the optical elements, and the like. Consequently, the pupillary axial direction is a line that is bent through reflecting on the optical elements, passing through the optical elements, and so forth.

In one example of the head-mounted display system according to the present invention, the direction of emission of the light that is emitted from each of the light-emitting diodes is coincident with the pupillary axial direction. That is, the bright image displaying light is directed to the eye of the observer. Furthermore, the plurality of light-emitting diodes is arranged so that each of the individual light-emitting diodes is the same distance from the flat panel. That is, an image displaying light wherein brightness non-uniformity has been reduced so that the brightness at the top edge portion of the virtual image that is to be viewed is equal to the brightness at the bottom edge portion thereof is directed to the eye of the observer.

In one embodiment, while the light that is emitted from the light-emitting diodes is light that diffuses at a spreading angle, the individual light-emitting diodes are arranged so as to be at equal distances from the flat panel, and a reflecting plate is formed on the inner peripheral face of the housing, and thus the light that is reflected from the reflecting plate is incident on the edge portions of the flat panel. In this regard, the image displaying light for which the brightness non-uniformity is reduced so that the brightness at the edge portions of the virtual image of that which is to be observed is increased and is directed toward the eye of the observer.

As described above, the examples of the head-mounted display system according to the present invention enables an observer to view a virtual image of an observed object with high brightness and with reduced brightness non-uniformity.

In one example of the head-mounted display system according to the present invention, the plurality of light-emitting diodes may be arranged in a checkerboard grid pattern when viewed from the pupillary axial direction.

The "arranged in a checkerboard grid pattern" can refer to an arrangement alternating, in both the row direction and the column direction, between the presence and absence of a light-emitting diode, and also known as a checkerboard pattern.

Furthermore, in other examples of the head-mounted display system according to the present invention, a plurality of light-emitting diodes may be categorized into a first light-emitting diode array and a second light-emitting diode array, where not only are the individual light-emitting diodes that are categorized into the first light-emitting diode array arranged so that each is at a first distance from the flat panel, but also the individual light-emitting diodes that are categorized into the second light-emitting diode array are arranged so as to each is a second distance from the flat panel, where the first distance is shorter than the second distance, and where the individual light-emitting diodes that are categorized into the first light-emitting diode array are formed on a transparent substrate through which light passes.

In one embodiment of the head-mounted display system according to the present invention, the projecting mechanism and eye-proximate optical system are mounted on a helmet that is worn on the head of the observer, where the eye-proximate optical system may be a visor with a curved surface shape.

DETAILED DESCRIPTION

Examples according to the present invention are explained below using the drawings. Note that the present invention is not limited to the examples described below, but rather, of course, includes a variety of forms in a scope that does not deviate from the spirit or intent of the present invention.

Figure 3:
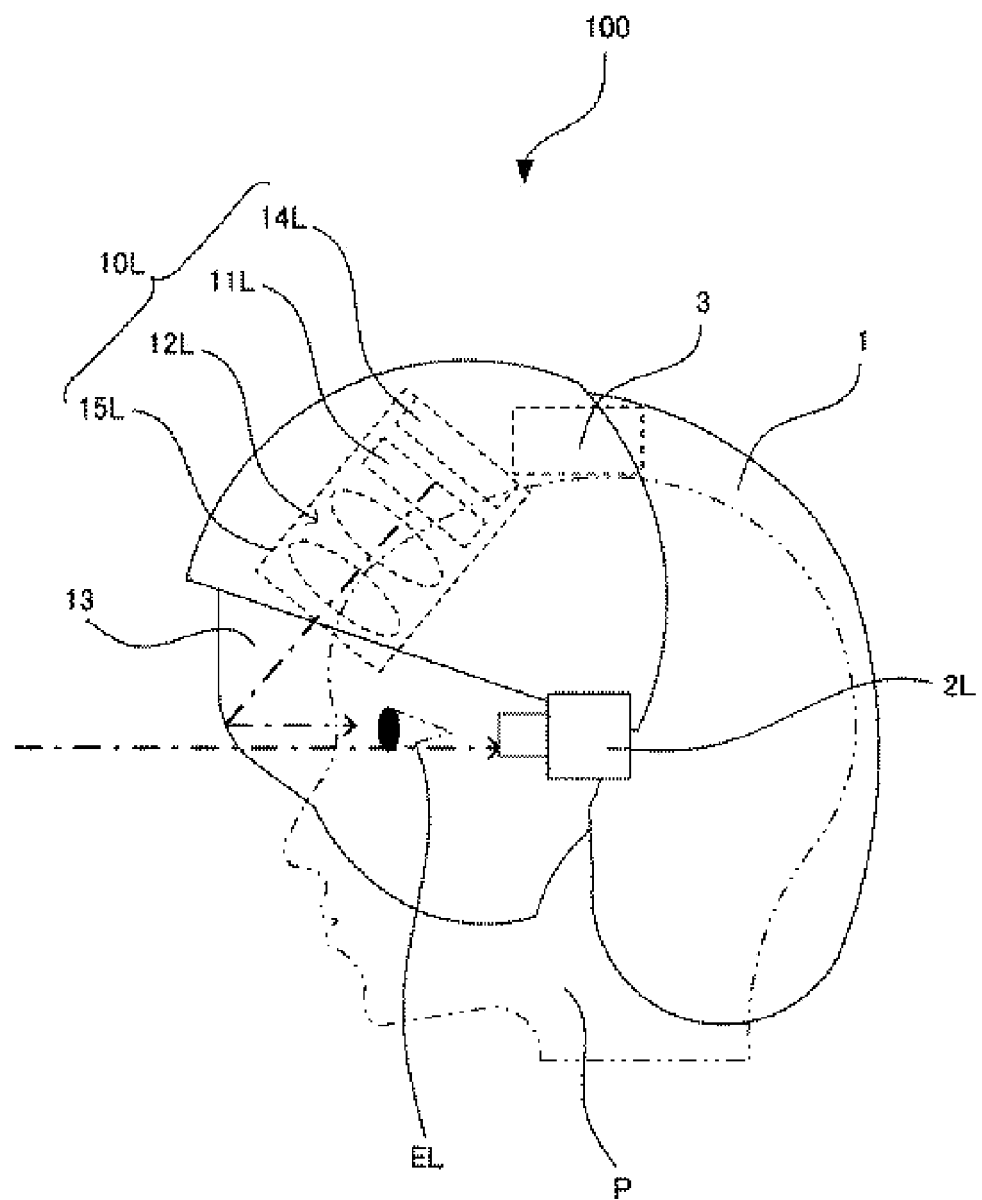
FIG. 3 is a side view diagram illustrating one example of a helmet with display system, worn on the head of a wearer.
Figure 4:
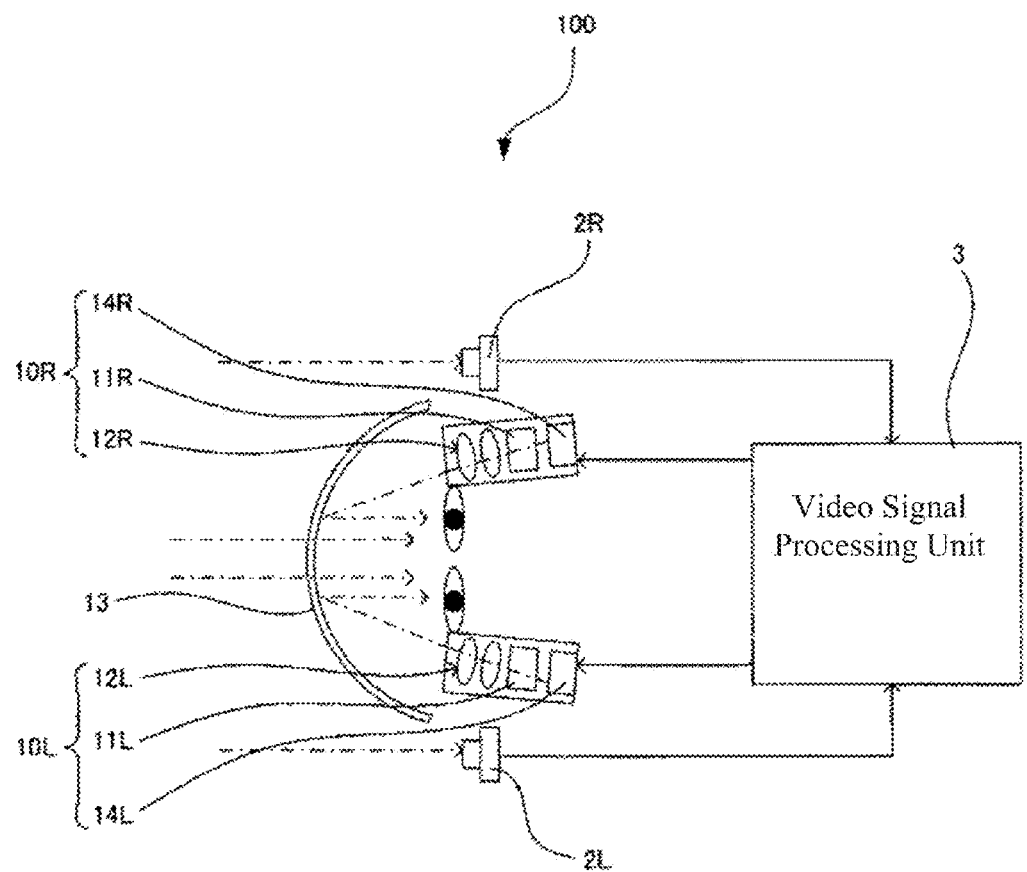
FIG. 4 is a plan view diagram illustrating a schematic structure of the helmet with a display system that is illustrated in FIG. 3.
Figure 5:
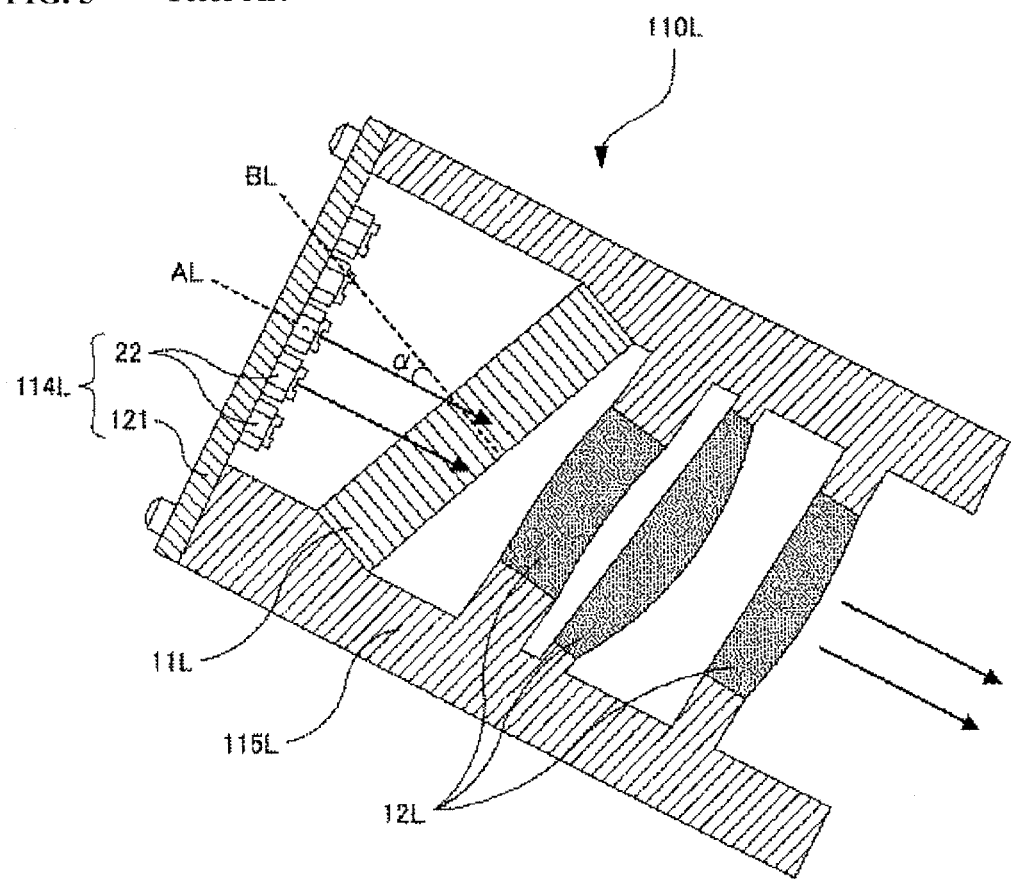
FIG. 5 is a cross-sectional diagram illustrating one example of a schematic structure of a conventional left-eye display unit.
Figure 6:
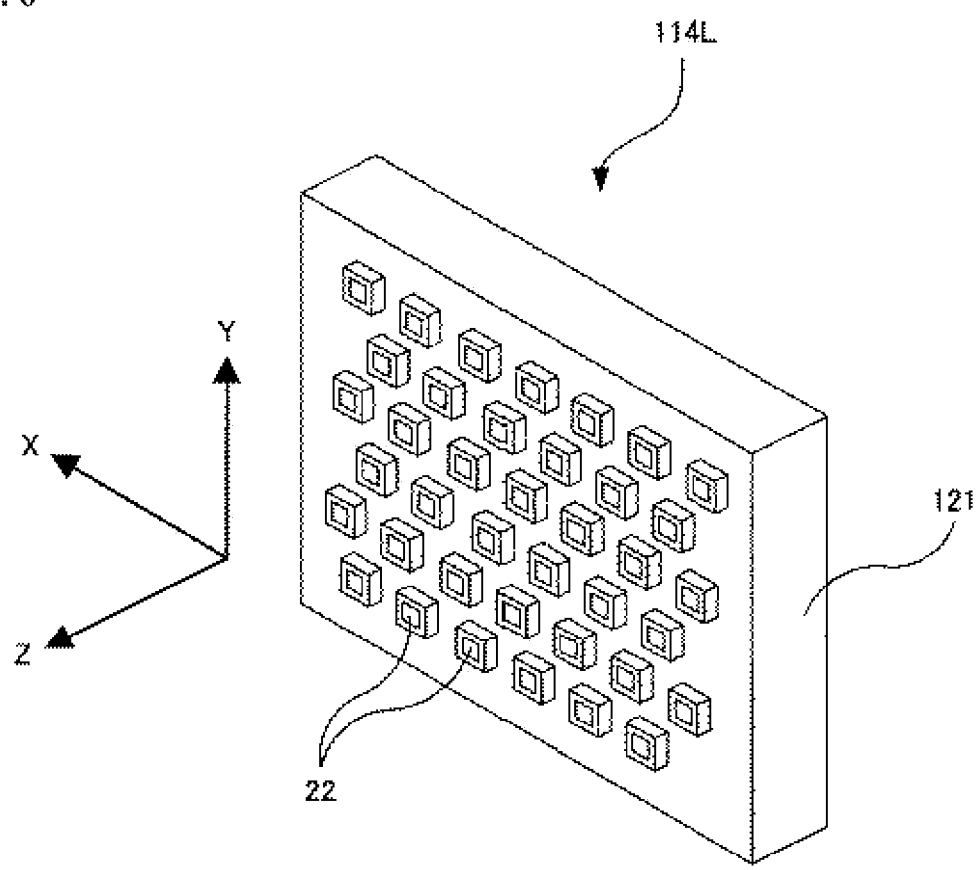
FIG. 6 is a perspective diagram of the light source illustrated in FIG. 5.
Figure 7:
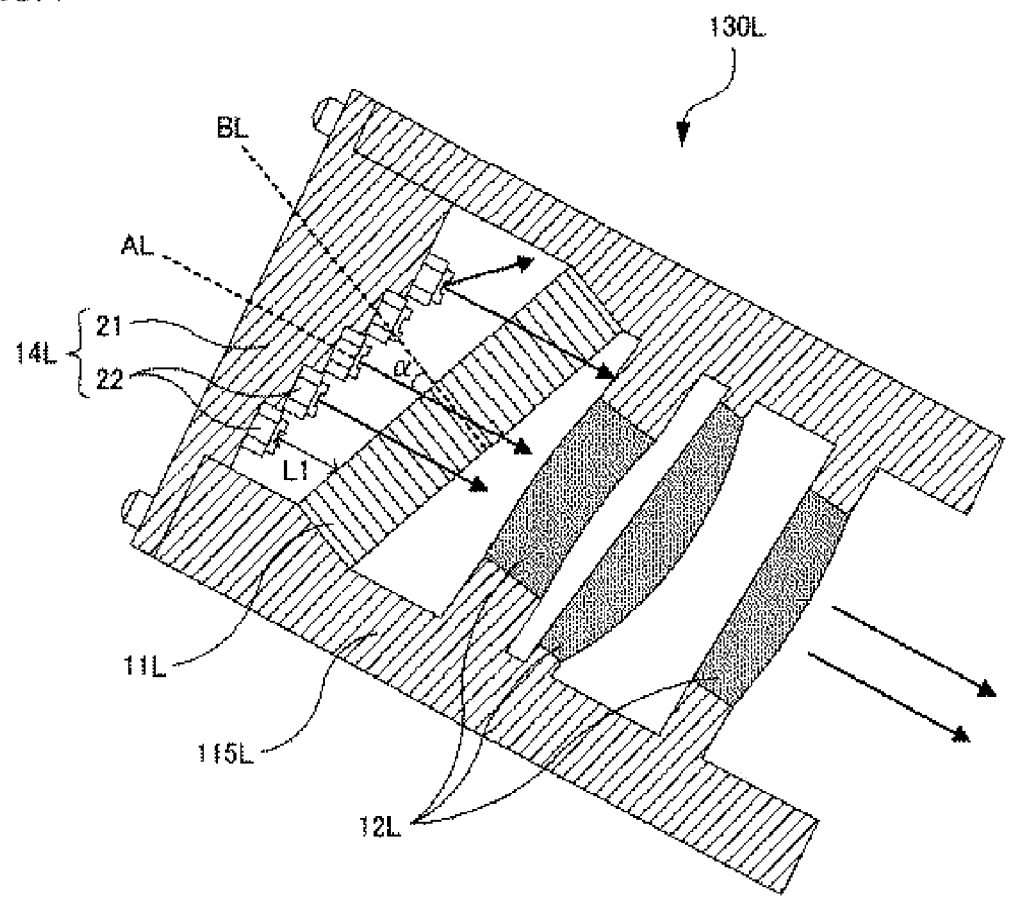
FIG. 7 is a cross-sectional diagram illustrating another example of a schematic structure of a left-eye display unit.

FIG. 3 is a side view diagram illustrating one example of a helmet with a display system (e.g., a head-mounted display system) that is worn on the head of a wearer, and FIG. 4 is a plan view diagram illustrating the schematic structure of the helmet with a display system that is illustrated in FIG. 3. Note that the parts that are similar to the left-eye display unit 110L are assigned identical reference numbers.

In one embodiment, the helmet with display system 100 includes a helmet 1 that is worn on the head of a wearer P; a visor (an eye-proximate optical system) 13 that is placed in front of the wearer P; a left-eye night-vision camera 2L, placed on the left side of the helmet 1, for capturing a left-eye image; a right-eye night-vision camera 2R, placed on the right side of the helmet 1, for capturing a right-eye image; a left-eye display unit (projecting mechanism) 10L that is placed to the upper left of the wearer P; a right-eye display unit (projecting mechanism) 10R that is placed to the upper right of the wearer P; and a video signal processing unit 3 for controlling the left-eye night-vision camera 2L, the right-eye night-vision camera 2R, the left-eye display unit 10L, and the right-eye display unit 10R.

Figure 1:
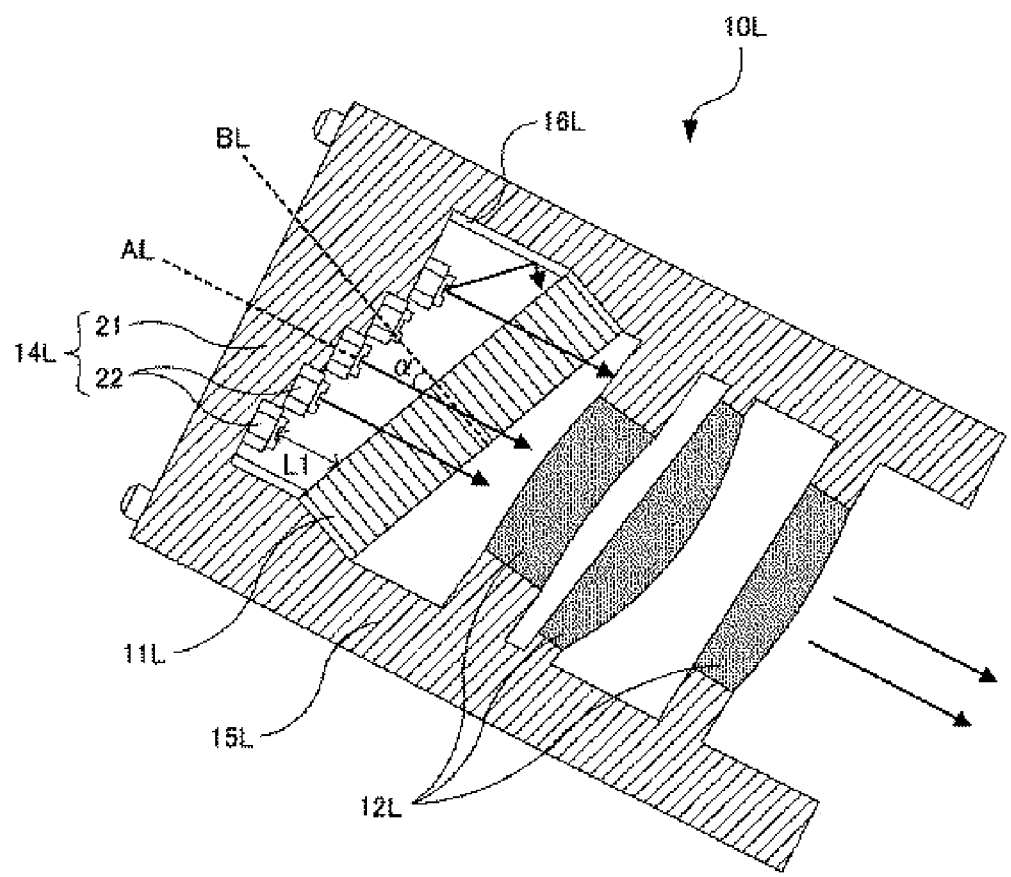
FIG. 1 is a cross-sectional diagram illustrating one example of a schematic structure of a left-eye display unit according to an example.
Figure 2:
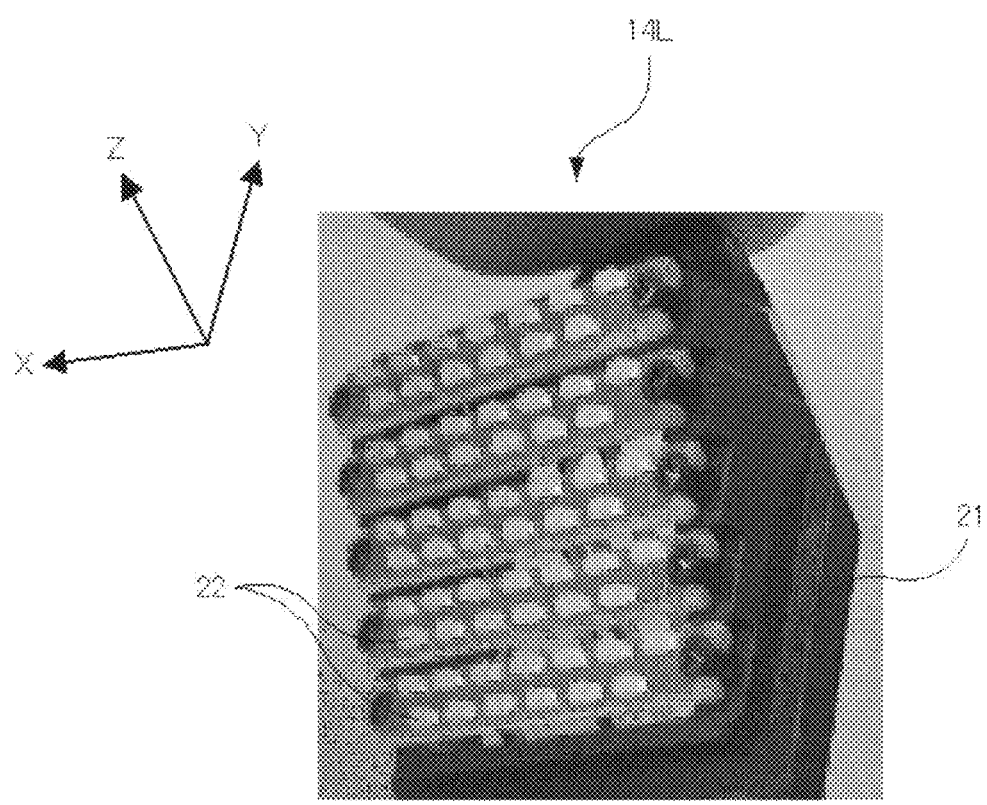
FIG. 2 is a perspective diagram of the light source illustrated in FIG. 1.

FIG. 1 is a cross-sectional diagram illustrating one example of a schematic structure for the left-eye display unit. FIG. 2 is a perspective diagram of the light source illustrated in FIG. 1.

The left-eye display unit 10L has a light source 14L, a transmissive flat-panel liquid crystal display 11L; some optical elements 12L that reduce the blurring and distortion in the virtual image of the observed object; and a rectangular cylindrical plastic housing 15L.

In one embodiment, a light source 14L is placed on the inside of one end portion side of the rectangular cylindrical housing 15L, some optical elements 12L are placed on the inside portion of the other end portion side of the cylindrical housing 15L, and a transmissive flat-panel liquid crystal display 11L is placed on the inside, in the center portion, of the cylindrical housing 15L.

In one embodiment, a reflecting plate 16L is formed on the inner peripheral face of the rectangular cylindrical housing 15L between the one end portion side thereof and the center portion thereof (e.g., between the light source 14L and the transmissive flat-panel liquid crystal display 11L). The reflective plate 16L reflects light.

A mirror, or the like, may be used as the aforementioned reflective plate.

In one embodiment, the light source 14L has a plastic substrate 21 of a stair-step shape (e.g., a five-step stair-step shape) so as to protrude in the Z direction, and a plurality (e.g., 65) light-emitting diodes 22.

In one embodiment, a plurality of (e.g., 13) light-emitting diodes 22 are arranged two-dimensionally in two rows on the face of the first step (an XY plane) of the substrate 21, a plurality (e,g., 13) of light-emitting diodes 22 are arranged two-dimensionally in two rows on the face of the second step (an XY plane), and so forth, so that a plurality (e.g., 13) of light-emitting diodes 22 are arranged two-dimensionally in two rows on the face of each individual step (which are each XY planes). At this time, the plurality (e.g., 65) of light-emitting diodes 22 are arranged so that, when viewed from the pupillary axial direction AL, a checkerboard grid shape is formed. For example, each of the individual light-emitting diodes 22 emits light in a direction that is perpendicular to the XY plane (that is, the Z direction).

In one embodiment, the light source 14L is secured within the housing 15L so that the Z direction is coincident with the pupillary axial direction AL and so that each of the individual light-emitting diodes 22 is at an equal distance $L_1$ from the flat panel. This causes the image that is displayed on the flat-panel to be illuminated. For example, the Z direction is coincident with the pupillary axial direction AL, and thus a left-eye image displaying bright light is directed to the left eye EL of the wearer P. In one embodiment, because the plurality (e.g., 65) light-emitting diodes 22 are arranged so that each individual light-emitting diode 22 is at an equal distance $L_1$ from the flat panel, left-eye image displaying light wherein there is no brightness non-uniformity, and wherein the brightness of the top edge portion of the virtual image of the observed object is equal to the brightness at the bottom-edge portion, is directed to the left eye EL of the wearer P.

In one embodiment, while the light that is emitted from the light-emitting diodes 22 diffuses at some spreading angle (e.g., 120°), the plurality of light-emitting diodes 22 are arranged so that the individual light-emitting diodes 22 are each at an equal distance $L_1$ from the flat panel. Accordingly, the formation of the reflecting plate 16L on the inner peripheral face of the housing 15L causes the light that is reflected on the reflecting plate 16L to illuminate the peripheral edge portions of the flat panel. The result is a left-eye image displaying light wherein the brightness non-uniformity is reduced so that the brightness of the peripheral edge portion of the virtual image of the observed object is bright and is directed to the left eye EL of the wearer P.

In one embodiment, the right-eye display unit 10R has the sane structure as the left-eye display unit 10L.

As described above, the helmet with display system 100 according to an example of the present invention, provides for the wearer P to view a virtual image of the observed object with high brightness and reduced brightness non-uniformity.

Figure 8:
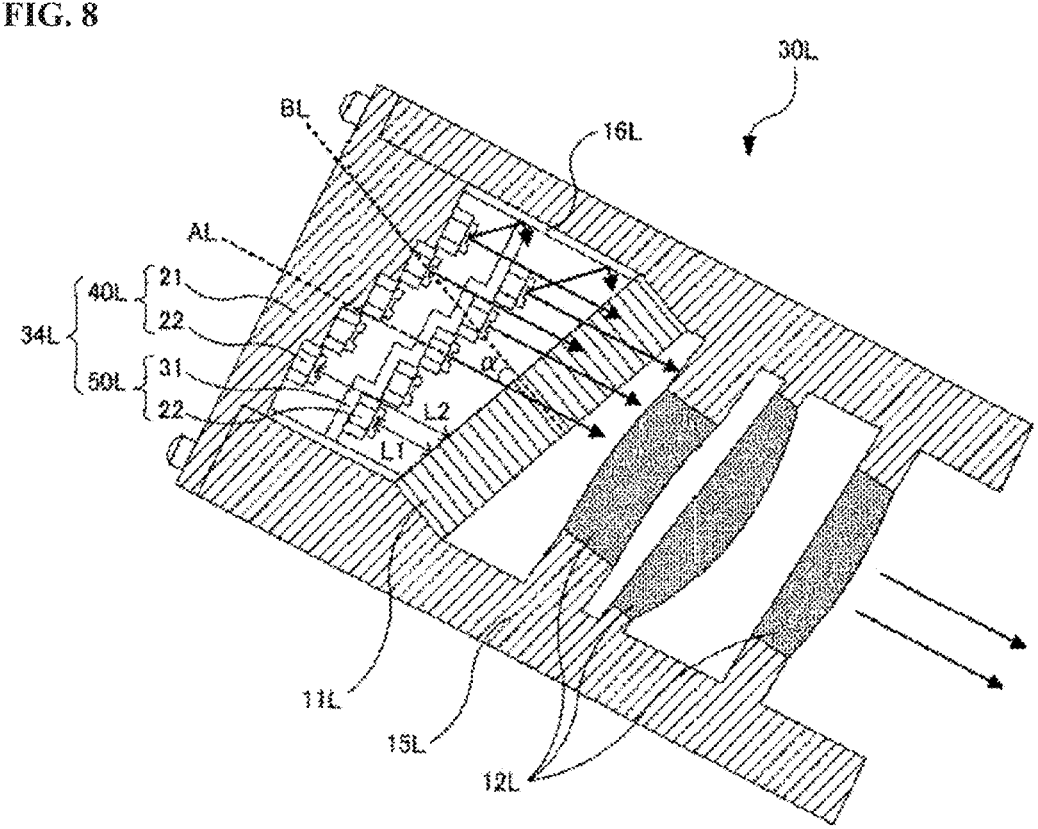
FIG. 8 is a cross-sectional diagram illustrating a further example of a schematic structure of a left-eye display unit.
Figure 9:
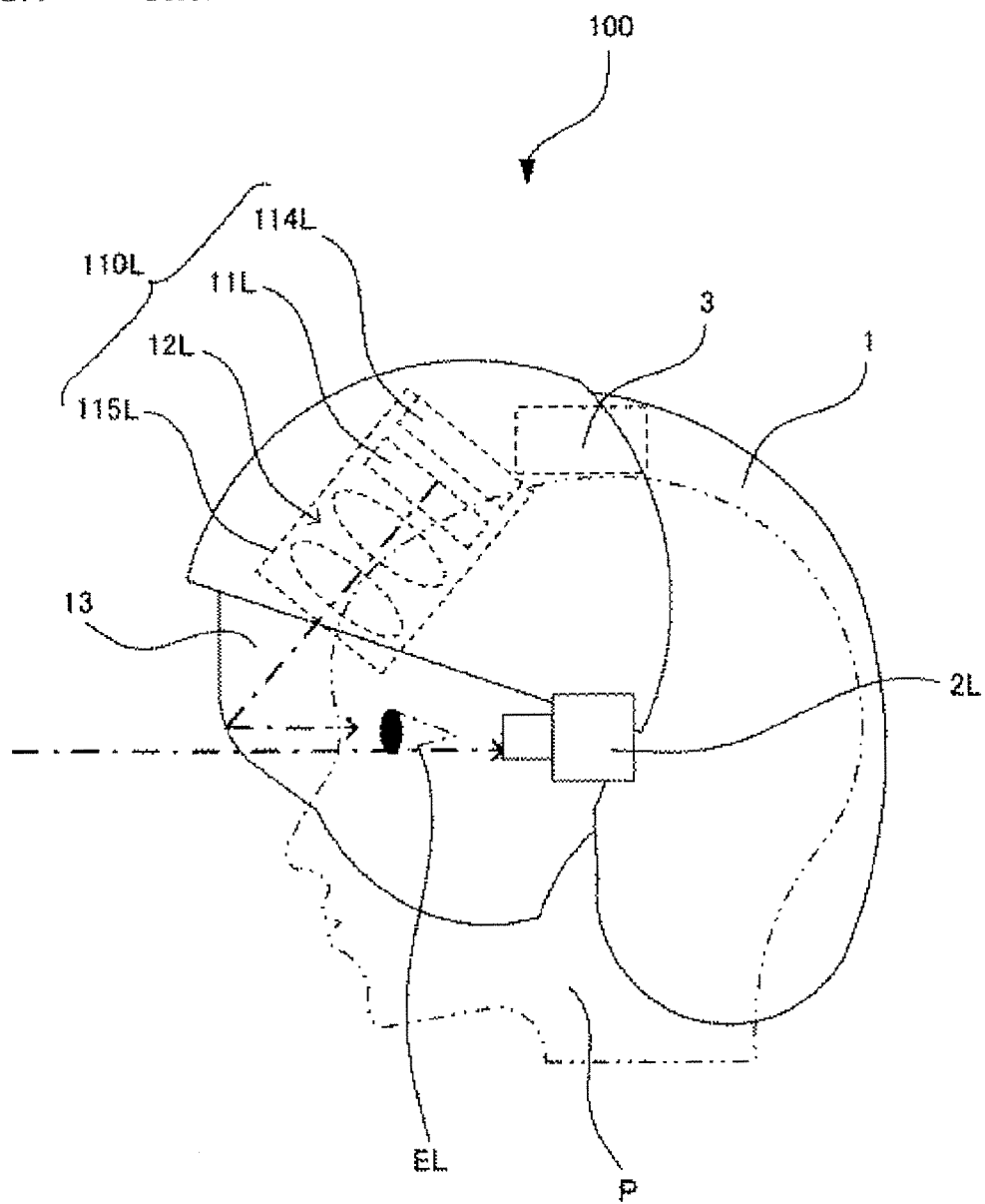
FIG. 9 is a side view diagram illustrating one prior art example of a helmet with a display system, worn on the head of a wearer.
Figure 10:
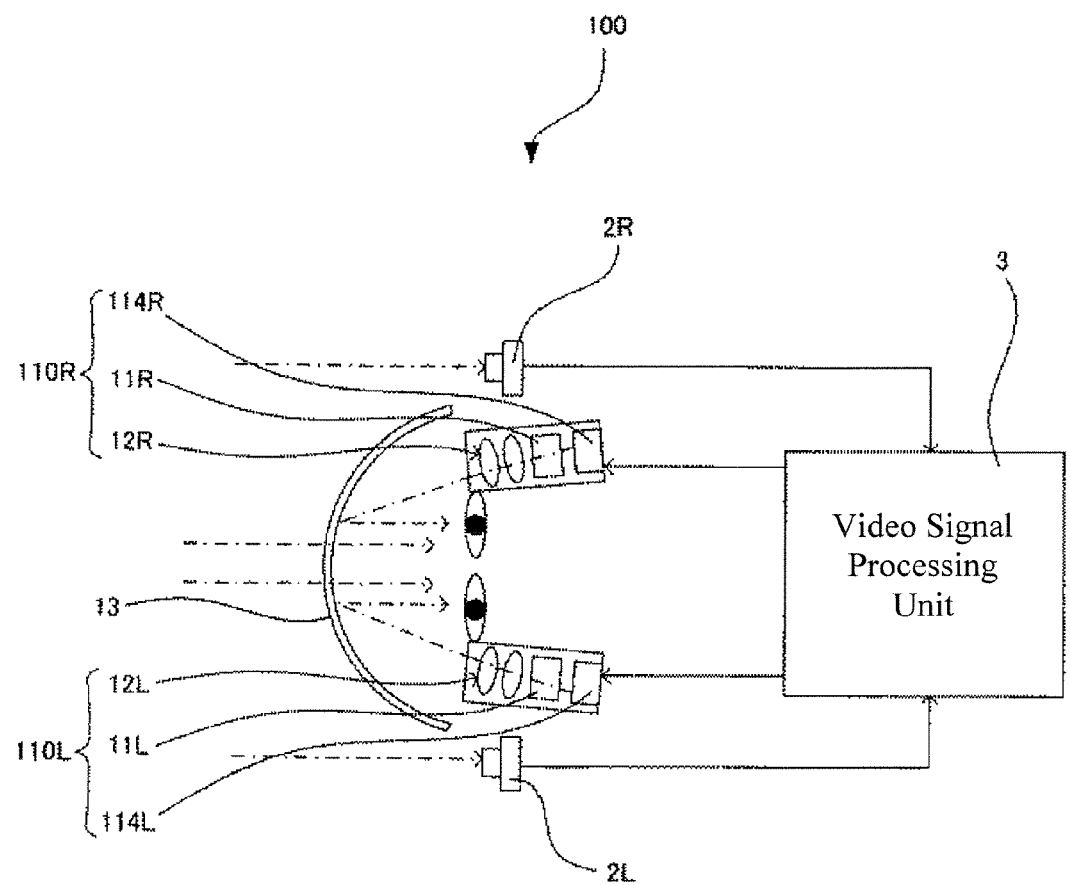
FIG. 10 is a plan view diagram illustrating a prior art schematic structure of the helmet with display system that is illustrated in FIG. 9.

While a structure that uses a left-eye display unit 10L was illustrated in the helmet with display system 100, described above, the structure may instead use a left-eye display unit 30L as described below. FIG. 8 is a cross-sectional diagram of one example of a schematic structure for a left-eye display unit.

In one embodiment, the left-eye display unit 30L includes a light source 34L, a transmissive flat-panel liquid crystal display 11L; some optical elements 12L that reduce the blurring and distortion in the virtual image of the observed object; and a rectangular cylindrical plastic housing 15L. Note that identical codes are assigned as with the left-eye display unit 10L.

For example, a light source 34L is placed on the inside of one end portion side of the rectangular cylindrical housing 15L, some optical elements 12L are placed on the inside portion of the other end portion side of the cylindrical housing 15L, and a transmissive flat-panel liquid crystal display 11L is placed on the inside, in the center portion, of the cylindrical housing 15L.

In one example, a reflecting plate 16L is formed on the inner peripheral face of the rectangular cylindrical housing 15L between the one end portion side thereof and the center portion thereof (e.g., between the second light source 40L and the transmissive flat-panel liquid crystal display 114

The light source 34L has a first light source 50L and a second light source 40L.

In one embodiment, the first light source 50L has a transparent substrate 31 of a stair-step shape (e.g., a five-step stair-step shape) so as to protrude in the Z direction, and a plurality (e.g., 65) light-emitting diodes (e.g., a first light-emitting element array) 22. The transparent substrate 31 transmits light.

A plurality of (e.g., 13) light-emitting diodes 22 are arranged two-dimensionally in two rows on the face of the first step (an XY plane) of the transparent substrate 31, a plurality (e.g., 13) light-emitting diodes 22 are arranged two-dimensionally in two rows on the face of the second step (an XY plane), and so forth, so that a plurality (e.g., 13) light-emitting diodes 22 are arranged two-dimensionally in two rows on the face of each individual step (which are each XY planes). At this time, the plurality (e.g., 65) of light-emitting diodes 22 are arranged so that, when viewed from the pupillary axial direction AL, a checkerboard grid shape is formed. In one example, each of the individual light-emitting diodes 22 emits light in a direction that is perpendicular to the XY plane (that is, the Z direction).

For example, a transparent plastic, may be used for the material for the aforementioned transparent substrate.

The second light source 40L has a plastic substrate 21 of a stair-step shape (e.g., a five-step stair-step shape) so as to protrude in the Z direction, and a plurality (e.g., 65) light-emitting diodes (a second light-emitting element array) 22.

A plurality of (e.g., 13) light-emitting diodes 22 are arranged two-dimensionally in two rows on the face of the first step (e.g., an XY plane) of the substrate 21, a plurality of (e.g., 13) light-emitting diodes 22 are arranged two-dimensionally in two rows on the face of the second step (an XY plane), and so forth, such that a plurality of (e.g., 13) light-emitting diodes 22 are arranged two-dimensionally in two rows on the face of each individual step (which are each XY planes). For example, the plurality (e.g., 65) of light-emitting diodes 22 are arranged such that, when viewed from the pupillary axial direction AL, a checkerboard grid shape is formed. In one example, each of the individual light-emitting diodes 22 emits light in a direction that is perpendicular to the XY plane (that is, the Z direction).

In one embodiment, the first light source 50L is secured within the housing 15L such that the Z direction is coincident with the pupillary axial direction AL and such that each of the individual light-emitting diodes 22 is at an equal first distance L1 from the flat panel. The second light source 40L is secured within the housing 15L such that the Z direction is coincident with the pupillary axial direction AL and such that each of the individual light-emitting diodes 22 is at an equal second distance L2 from the flat panel. In one embodiment, the first distance L1 is shorter than the second distance L2. While the light that is emitted from the second light source 40L is incident on the first light source 50L at this time, it passes through the transparent substrate 31 of the first light source 50L, to arrive at the flat panel.

This causes the image that is displayed on the flat-panel to be illuminated. At this time, the Z directions of the first light source 50L and of the second light source 40L are coincident with the pupillary axial direction AL. Accordingly, a bright left-eye image displaying light is directed to the left eye EL of the wearer P.

For example, because the individual light-emitting diodes 22 of the first light source 50L are arranged so as to each be at an equal distance L1 from the flat panel, and the individual light-emitting diodes 22 of the second light source 40L are arranged such that each is an equal distance L2 from the flat panel, left-eye image displaying light wherein there is no brightness non-uniformity, and wherein the brightness of the top edge portion of the virtual image of the observed object is equal to the brightness at the bottom-edge portion, is directed to the left eye EL of the wearer P.

In one embodiment, while the light that is emitted from the light-emitting diodes 22 is light that diffuses at some spreading angle (e.g., 120°), because the individual light-emitting diodes 22 of the first light source SOL are arranged such that each is an equal distance L1 from the flat panel, and the individual light-emitting diodes 22 of the second light source 40L are arranged such that each is an equal distance L2 from the flat panel, and the formation of the reflecting plate 16L on the inner peripheral face of the housing 15L causes the light that is reflected on the reflecting plate 16L to illuminate the peripheral edge portions of the flat panel. The result is that a left-eye image displaying light wherein the brightness non-uniformity is reduced so that the brightness of the peripheral edge portion of the virtual image of the observed object will be bright and will be directed to the left eye EL of the wearer P.

As described above, the helmet with display system according to the present invention provides for the wearer P to view a virtual image of the observed object with high brightness and reduced brightness non-uniformity.

Note that the aforementioned image displaying light may be directed to just one eye of the wearer, and the reflective face of the aforementioned visor may be structured from a fully-reflective mirror.

The present invention may be used in a head-mounted display system for providing a virtual image of an object that is viewed by an observer.

The invention claimed is:

1. A head-mounted display system comprising:
   a projecting mechanism comprising:
      a light source including first light-emitting diodes;
      a reflector for reflecting light from the light source;
      a flat-panel display including a flat-panel configured to control the light from the light source; and
      a housing containing the light source, the reflector, and the flat-panel display in this order, the reflector being disposed on an inner surface of the housing; and
   an eye-proximate optical system placed in front of one of left and right eyes of an observer, wherein
   the light from the projecting mechanism is directed to the one of left and right eyes of the observer through the eye-proximate optical system to form a an image to be perceived by the one of left and right eyes of the observer,
   optical axes of the first light-emitting diodes are parallel with a pupillary axial direction to the one of left and right eyes of the observer, and
   a direction normal to the flat-panel is not parallel with the pupillary axial direction;
   distances between the flat-panel and the respective first light-emitting diodes are equal to each other.

2. The head-mounted display system as set forth in claim 1, wherein the first light-emitting diodes are arranged in a checkerboard grid pattern.

3. A head-mounted display system comprising:
   a projecting mechanism comprising:
      a light source including a plurality of light-emitting diodes;
      a flat-panel display producing an image on a flat-panel; and
      a cylindrical housing;
      wherein the light source and the flat-panel display are placed within the housing, and the image that is displayed on the flat-panel is illuminated with light from the light source, to project image displaying light for displaying the image; and
   an eye-proximate optical system placed in front of an eye of an observer, wherein:
   the image displaying light that is emitted from the projecting mechanism is directed to the eye of the observer through the eye-proximate optical system to form a virtual image of an observed object in front of the observer, wherein the flat-panel display is secured within the housing such that the normal direction to the flat-panel is not coincident with the pupillary axial direction;
   the light source is secured within the housing such that the directions of emission of the light that is emitted from the individual light-emitting diodes is coincident with the pupillary axial direction, and such that the individual light-emitting diodes are each at an equal distance from the flat panel;
   a reflecting plate reflecting the light that is emitted from the light source is formed on the inner peripheral face of the housing, and is placed between the light source and the flat-panel display, the plurality of light-emitting diodes are categorized into a first light-emitting element array and a second light-emitting element array;

the individual light-emitting diodes that are categorized into the first light-emitting element array are each placed at an equal first distance from the flat-panel;

the individual light-emitting diodes that are categorized into the second light-emitting element array are each placed at equal second distance from the flat-panel;

the first distance is shorter than the second distance; and each of the individual light-emitting diodes categorized into the first light-emitting element array is formed on a transparent substrate through which light passes.

4. The head-mounted display system as set forth in claim 1, wherein:

the projecting mechanism and the eye-proximate optical system are mounted on a helmet that is worn on the head of the observer; and the eye-proximate optical system is a visor with a curved surface shape.

5. The head-mounted display system as set forth in claim 1, wherein the light source further includes second light-emitting diodes, distances between the flat-panel and the respective second light-emitting diodes are equal to each other, and the distances between the flat-panel and the respective second light-emitting diodes are shorter than the distances between the flat-panel and the respective second light-emitting diodes.

6. The head-mounted display system as set forth in claim 5, wherein the light source includes a transparent substrate on which the first light-emitting diodes are arranged, the transparent substrate being disposed over the second light-emitting diodes so that light from the second light-emitting diodes pass through that transparent substrate.

7. The head-mounted display system as set forth in claim 1, further comprising a camera, wherein the flat-panel is configured control the light in accordance with an image signal from the camera.

* * * * *